Feb. 2, 1971  G. E. BEISEL, JR., ET AL  3,560,991
STATION KEEPING, COLLISION AVOIDANCE AND POSITION FIXING SYSTEM
Filed Aug. 26, 1968  7 Sheets-Sheet 1
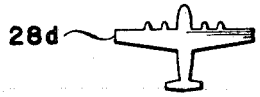
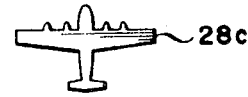
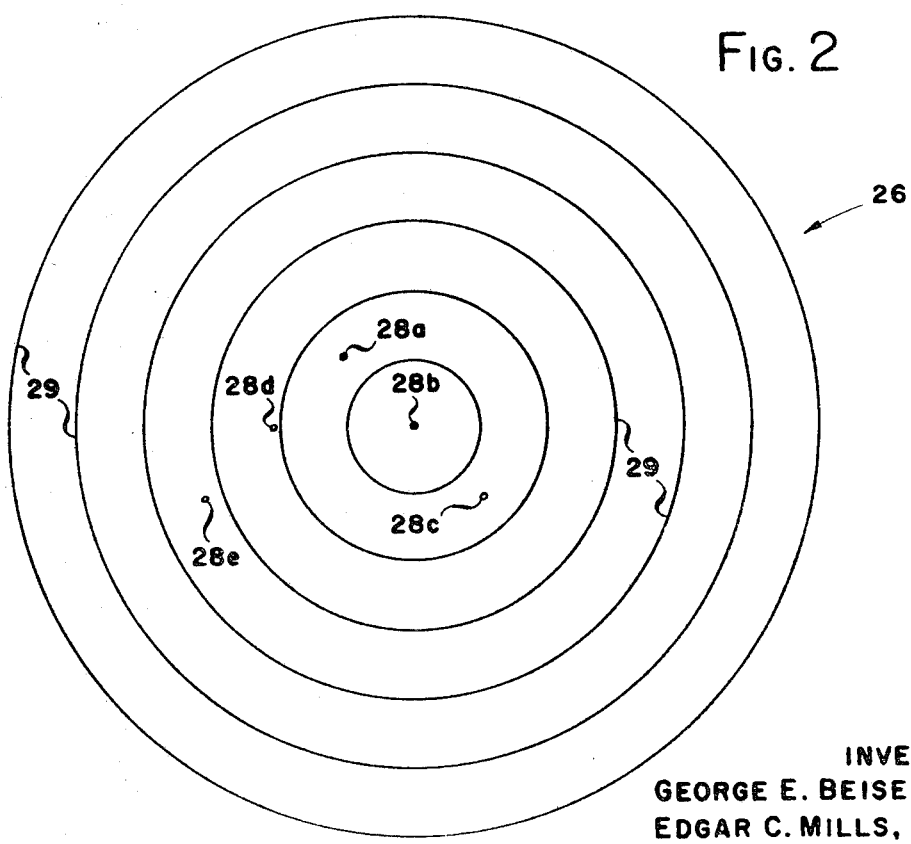
Fig. 1
Fig. 2
INVENTORS.
GEORGE E. BEISEL, JR.
EDGAR C. MILLS, JR.
BY
*George C. Sullivan*
Agent
*James A. Hinkle*
Attorney

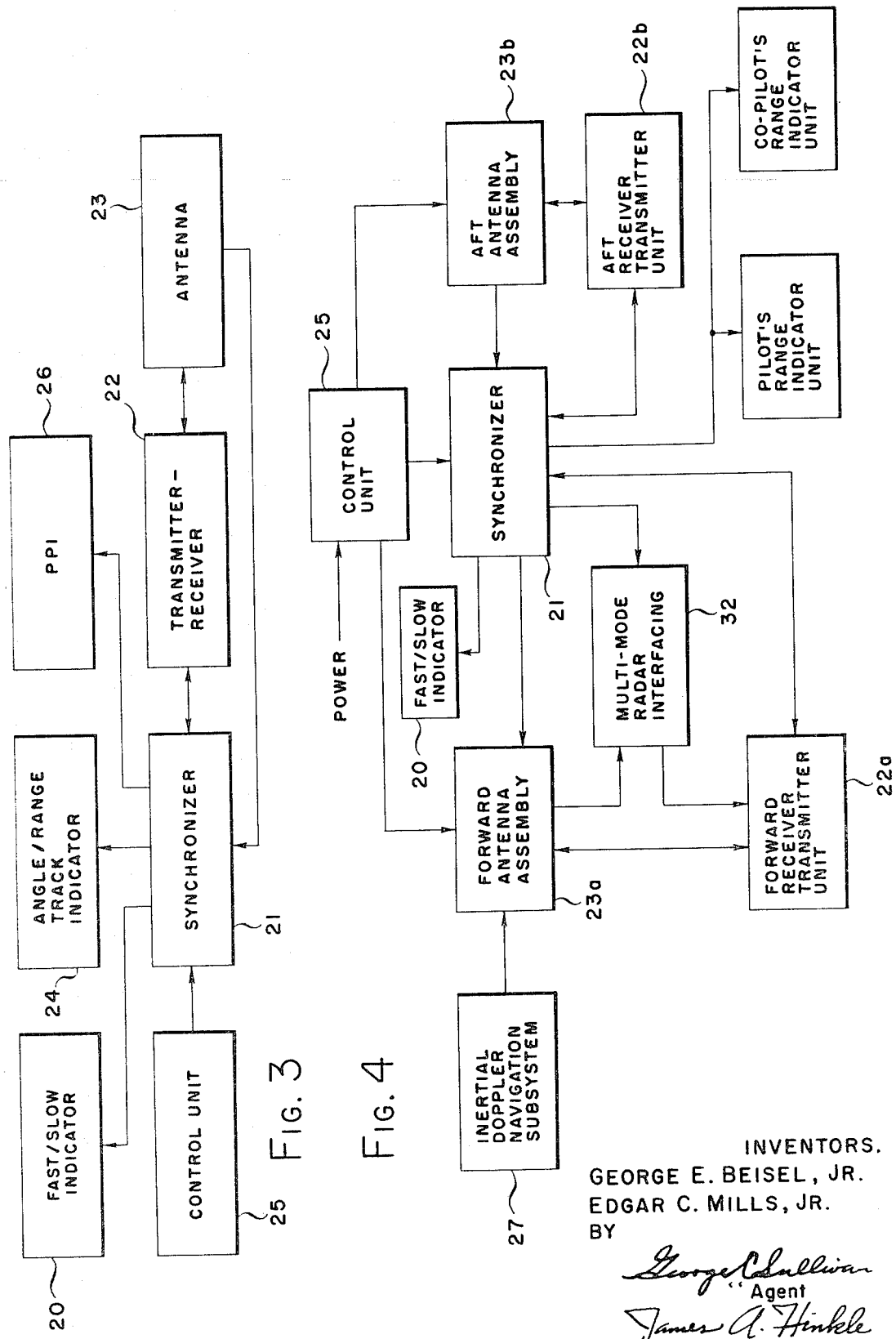

United States Patent Office 3,560,991
Patented Feb. 2, 1971

3,560,991
STATION KEEPING, COLLISION AVOIDANCE
AND POSITION FIXING SYSTEM
George E. Beisel, Jr., and Edgar C. Mills, Jr., Marietta, Ga., assignors to Lockheed Aircraft Corporation, Burbank, Calif.
Filed Aug. 26, 1968, Ser. No. 755,301
Int. Cl. G01s 9/10
U.S. Cl. 343—7.5
12 Claims

ABSTRACT OF THE DISCLOSURE

A system for determining the position of one vehicle relative to another by an all-master control technique in which the integrity of the formation of vehicles is independent of the presence of any other member of the formation and no restriction is necessary on the position of any other vehicle in the formation. Time synchronization of all formation members is necessary as time sharing is utilized on a single transmitting frequency and each vehicle beacons only on a time slot division arbitrarily assigned to its identification number. The time synchronization mechanism primarily sets all vehicle system clocks to the same reference instant of $T_0$ and each transmission occurs at the beginning of the time slot for that particular vehicle. Since each vehicle is assigned an identification number associated with a particular time slot, that vehicle is also identifying itself. Synchronization occurs in a formation by all vehicles automatically setting their clocks to the fastest clock in the formation. The system does not require coordination with ground or other stations external of the formation for synchronization assistance.

---

This invention relates in general to an aircraft station keeping system and more particularly to a station keeping system primarily adapted to, but not limited to, allowing close and safe separation of adjacent vehicles operating in a large formation wherein the aircraft in the formation are not dependent upon an assigned "master" station, whether it be one on the ground or another aircraft.

In the operation of a plurality of aircraft in massed or formation flying it is desirable, if not imperative, that some technique or system be provided for enabling the pilot of each aircraft in the formation to determine whether his aircraft is presently occupying its proper preassigned location. An example of a mission requiring precise locational control of the aircraft in a formation is found in a paradrop of material and/or personnel where small ground dispersion is mandatory for tactical reasons. Further, it is most desirable in formation flying that all aircraft maintain their preassigned locations so that collisions and other mishaps will not occur.

The basic approach taken in the past to this problem of formation flying required little or no auxiliary apparatus. The pilot of the following aircraft picked out a portion of the aircraft with which he was maintaining a positional reference and visually located this portion of the lead aircraft with respect to some fixed reference point on his windscreen or elsewhere in the cockpit. Maintaining formation position by this technique demanded nearly constant sighting on the lead aircraft and required continuous correction with the flight controls and engine power settings to maintain a relatively constant formation location with respect to the lead aircraft. Such conditions obviously are conducive to pilot tenseness and fatigue after a relatively short period of time. Moreover, even under good visual flying conditions, this system is capable of only moderate locational accuracy. Under instrument flying conditions, this method of formation flying obviously becomes impractical because of the inability of the pilots to maintain visual contact with their chosen lead or reference aircraft.

Quite frequently in present prior art systems dealing with station keeping and collision avoidance, a handicap is encountered because of the need to provide "master" stations, whether they be ground or air, to effect proper synchronization of the various timing means. In one known such collision avoidance system, as many aircraft as possible are equipped with timing devices which must be maintained in synchronism wherein each aircraft is assigned a specific time slot in which to check its timing device. During its assigned message slot each aircraft having a synchronized system will transmit information as to altitude, speed, heading, and other required data. Obviously by knowing the time at which a particular airplane is to transmit and also the time of receipt of a signal from that plane, it is possible to synchronize timing devices to calculate information as to relative positions of the sending and receiving aircraft and the rate of change in distance therebetween. It is obvious that the timing means in the aircraft must be synchronized. Such synchronization is frequently done by having spaced ground station locations to which the aircraft will be synchronized to a standard timing device. In actual use the concept of having master stations will frequently prove to be inconvenient especially in remote parts of the globe, and, by the very magnitude of the concept, maintenance problems are greatly pyramided.

Another known station keeping system is where any aircraft in a particular formation is capable of a time sharing system of initiating synchronizing signals so as to function as a master radar to which the other aircraft in the formation are synchronized as slave units. In this particular system each aircraft is assigned a discrete time slot within a time base. Therefore, the radar in each aircraft performs a pure radar function once during the running of each time base and within the particular time slot assigned to that particular aircraft. Each aircraft then performs an interrogation function during its assigned time slot in which any other aircraft in the system replies by means of a transponder initiated by its own radar transmitter so that the indication of the replying aircraft will be projected upon the receiving aircraft's indicator means. A disadvantage of this particular system is the necessity of having master and slave units and also the necessity of operating on a purely radar basis in which the signals necessarily have to travel both ways to provide intelligent information.

Accordingly, the present invention provides a system for determining the position of one vehicle relative to another by what may be called an "all master system." The system of the present invention is intended as a means to allow a large number of vehicles to maintain desired separation from each other while in formation and be present to the vehicle operator a measurement of slant range separation between his vehicle and any other selected vehicle in the formation and a display of the formation array in a horizontal plane upon a plan position indicator (PPI).

Further, the present invention makes the integrity of the formation independent of the presence of any other member of the formation and no restriction is necessary on the position of any vehicle within the formation. The present invention also provides time synchronizing means for synchronizing two or more timing devices wherein the all master feature is accomplished by means of the synchronizing slot, the use of which is determined by a higher cycle of synchronizing control. By this system, there is provided accurate means for determining the position and changes of position of vehicles, such as aircraft, so that the vehicles may not only maintain their assigned positions within a formation, but the probability of collision between members of the formation is greatly reduced.

Other objects, advantages, and capabilities of the invention will become apparent from the following description taken in conjunction with the accompanying drawings showing only a preferred embodiment of the invention.

In the drawings:

FIG. 1 shows a typical formation of vehicles, in this case aircraft, which may utilize the present invention;

FIG. 2 illustrates the viewing scope of a plan position indicator in which the formation of FIG. 1 is shown in a horizontal plan view;

FIG. 3 is a block diagram showing the basic components of the present invention;

FIG. 4 is illustrative of a more detailed block diagram of the invention;

Figure 5:
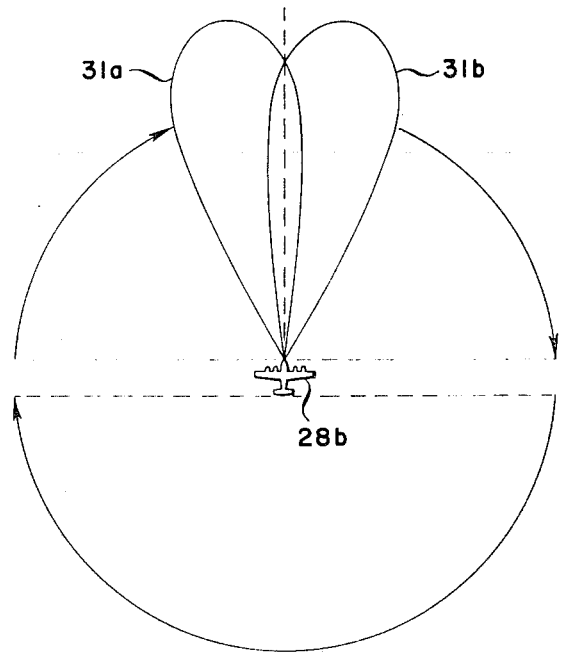
FIG. 5 shows a typical aircraft in plan view and further showing the directional antenna pattern and indicating that the antenna direction pattern may search both forwardly and rearwardly of the aircraft or alternatively one or the other.

In general, the present system opreates as a simultaneous range tracking and 360° PPI display system. Time sharing methods are utilized on a single transmitting frequency and will permit a large number of vehicles to operate in a formation in which range measurements are accomplished by establishing time synchronization of all participating vehicles and measuring the propagation time of each vehicle beacon transmission within its associated time slot. In making range measurements the system does not employ interrogator-transponder or radar techniques, but is a one way system. This of course necessitates that identical equipment be installed in all vehicles.

Time synchronization of all members of the formation is necessary for the system to function. Each vehicle beacons only in the time slot division assigned to its identification number. The transmission occurs at the beginning of the time slot and it is only necessary for the other participating vehicles to measure the time interval between the beginning of the time slot and the instant the pulse transmission is received. The time synchronization mechanism primarily sets all vehicle system clocks to the same reference instant of $T_o$, but since each vehicle is assigned an identification number associated with a particular time slot, that vehicle is also identifying itself if it transmits in a synchronized condition.

It is well known that the primary function of station keeping is that of range and azimuth and/or elevation determination. It is normally desirable to keep data rates high between transmitting and receiving vehicles, but for good PPI type displays separate time slots are not necessary for each aircraft. For PPI displays where the range and azimuth position of a vehicle is all that is required and it is not necessary to identify or locate any particular vehicle, only the synchronizing slot is required since all necessary range information is available within the synchronization slot in use at any instant of time. In this case, all vehicles transmit simultaneously except the one vehicle that is presently in the synchronization slot. Since for all practical purposes, each vehicle transmits in every time slot, the data rate is very high. However, in most cases it is necessary to identify a vehicle to meet some requirement such as range tracking, etc., and to accomplish this purpose it is necessary that each vehicle transmit separately in a discrete time slot. This apparent conflict of requirements is easily resolved by the higher cycle of synchronizing control that has been designated herein as the "calendar." This permits all vehicles to transmit simultaneously sometimes, in order to keep the data rate high, and transmit singly other times during the higher cycle of time control to permit identification and range tracking of a particular vehicle. Thus both requirements are met.

Another useful feature made possible by the higher cycle of synchronizing control is that, since a vehicle may be identified during its use of the synchronizing slot, an inadvertent selection of the same identification number by two or more individual vehicles maybe easily detected, all affected systems may be made instantly aware of the error. At times it may be advantageous to have formations of multiple vehicles in which vehicles of adjoining formations do not have a previously assigned time slot. During the initial synchronization period when the vehicle or vehicles join the formation, the use of the higher cycle of synchronization control may be employed to permit each vehicle to seek out and fall randomly into unused time slots, thereby effectively assigning its own time slot and identification number.

Figure 6:
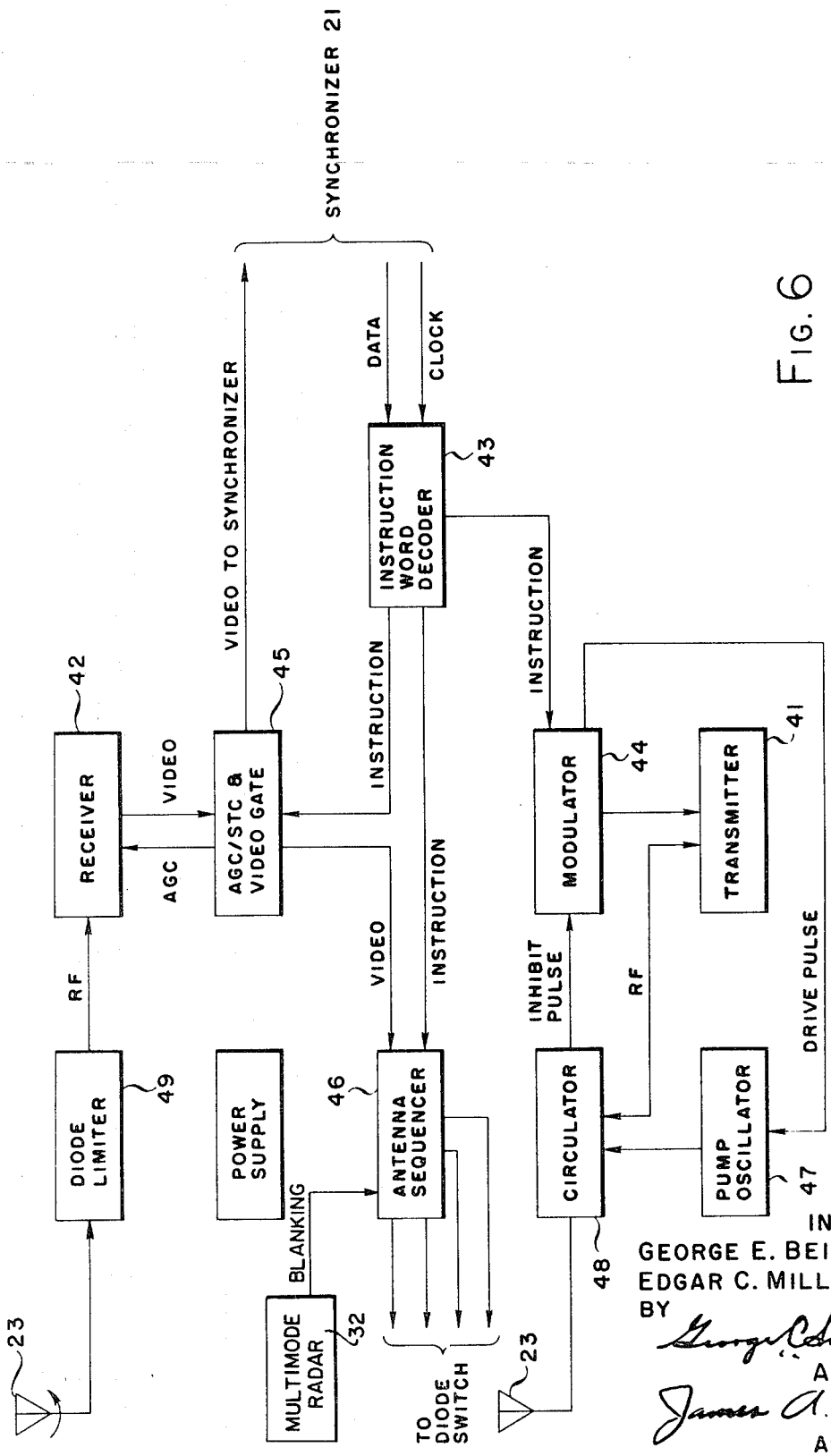
FIG. 6 shows a simplified diagram of the receiver-transmitter (R/T) unit.

The novel features of the present invention just above described will now be set forth more fully in particular detail. Referring to the drawings wherein like reference characters designate corresponding parts throughout the several figures, and especially referring to FIG. 3, it is seen that the system of the present invention comprises a fast/slow indicator 20, a synchronizer 21, a transmitter-receiver 22, an antenna system 23, an angle/range track indicator 24, and a control unit 25. The present block diagram of FIG. 3 also indicates a plan position indicator (PPI), which is a part of a multimode radar system, indicated by numeral 26 which, however, could be incorporated with the angle/range track indicator 24 if so desired. If it is desired to achieve 360° azimuth coverage, two receiver transmitters and two antennas may be required because of interference from physical portions of the vehicle and such a configuration is shown in the block diagram of FIG. 4 wherein an aft antenna assembly 23b is associated with an aft transmitter receiver unit 22b providing coverage of the aft 180° sector. Likewise, the forward 180° sector of the aircraft is covered by the forward antenna assembly 23a and the forward transmitter receiver unit 22a. The synchronizer 21 establishes the basic synchronization of timing with all vehicles, determines and directs the activity necessary by the receiver-transmitter during the synchronizing slot and contains the range counters and vehicle identification circuits. The PPI display, which is a well known type of unit, is included in the multimode radar interfacing and such interfacing, as shown in FIG. 6, has a blanking pulse which, through the antenna sequencer, is used to open all diode switches in the station keeping antenna to prevent radar transmissions from reaching the station keeping receiver for the prevention of damage and interference in the system.

The aircraft formation shown in FIG. 1 is but for illustrative purposes and it should be noted that enumerable formations of aircraft utilizing the present invention may at any time be utilized. Further, it is obvious that vehicles other than aircraft may be utilized with the present system with equally good results, however, aircraft are used herein as an operable medium for ease of understanding. In FIG. 1 several aircraft indicated by numerals 28a, 28b, 28c, 28d, and 28e are shown in a basic V formation. Each aircraft of this formation, or a selected portion of the formation, is normally shown upon the receiving aircraft's PPI 26. Such a formation is represented by FIG. 2, which, in fact, represents the PPI of aircraft 28b since this aircraft is positioned at the center of the PPI as would be the normal case with the receiving aircraft. The other aircraft of the formation are shown in their relative positions to aircraft 28b upon latter's PPI scope. The concentric rings 29 about the center of the PPI may be particular indicia for a desired purpose. However, most frequently such concentric circles indicate a graphical representation of ranges of the desired scale.

FIG. 5 shows the preferred method of range and angle tracking accomplished by a representative aircraft of the formation, such as aircraft 28b. Normally it is desired that the antenna search cover the complete 360° search circle, and therefore to accomplish this the aircraft may be equipped with both a forward antenna assembly 23a and an aft antenna assembly 23b. However, it should be noted that this is not necessarily mandatory if it is desired for the aircraft only to angle and range track in a desired 180° sector, or if the aircraft itself does not limit or interfere with a single antenna pattern. The two antenna arrays 23a and 23b are rotated in a clockwise direction in the horizontal plane. The rotation is synchronized and signal outputs are switched at the two mid-points between fore and aft such that only one array is active at any one time. While the FIG. 5 discloses a lobe switching technique of beam sharpening, it should be understood that any other type of beam sharpening technique, such as a monopulse system, could be utilized. However, for descriptive purposes herein the lobe switching technique will be described. Each antenna array sweeps 180° of coverage with a directional pattern composed of two beams 31a and 31b. Each beam, or lobe, is offset slightly from the electrical axis of the array, wherein as shown lobe 31a is to the left and lobe 31b is to the right. Beam sharpening is accomplished by sending the output signal to the PPI 26 only at the instant the received signal levels in the two beams are of equal magnitude. This occurs only at the electrical axis of the directional antenna array. The directional signal synchronizes the PPI sweep with the antenna rotation, thus providing azimuth determination for the display.

The navigation subsystem 27 supplies a signal bias, as indicated in the block diagram of FIG. 4, proportional to the angles between the ground track and the aircraft heading. Another signal indicates whether the bias is valid. If valid, it is used by the station keeping system to drift stabilize the antenna direction signal and, if not, the antenna direction is referenced to the aircraft center line. As a complete 180° sweep is completed by one or the other of the antenna arrays, the remaining antenna array begins its sweep of its complete 180° sector. The switchover control between the forward and aft antenna signal output is always referenced to the aircraft center line. Since it is normally desired to integrate the station keeping system of any aircraft into the overall radar system of an aircraft for simplification, the multi-mode radar interfacing 32 accomplishes this function. The PPI 26 is normally a part of the interfacing 32, which supplies the PPI display with synthetic target video range marks 29, aircraft identification video, and a sweep trigger.

Each receiver transmitter unit 22, whether it be a forward unit 22a or an aft unit 22b, is identical and is primarily a receiver and a transmitter while performing some peripheral functions. The receiver-transmitter normally receives instructions from the synchronizer 21 as to what pulse width is to be transmitted and the type of reception mode in which to operate. The transmitter pulses are normally of two different widths, wherein the first width is used during transmission of a synchronization word as directed from the synchronizer. The second pulse width is transmitted from which other aircraft are able to obtain ranging and azimuth information. The receiver portion of the unit operates on a frequency band width which allows it to receive the pulses transmitted by other aircraft operating within the desired operating radius. The received pulses are directed to the synchronizer unit where ranging and azimuth information is derived from the pulses. In addition, the receiver-transmitter unit also uses the received pulses to obtain antenna switching signal controls and AGC voltages for the receiver. The various modules comprising the receiver-transmitter unit 22 will be more fully described in the operation as set forth below.

The receiver-transmitter unit 22, as noted above, is primarily a transmitter 41 and a receiver 42 which normally performs their usual functions. However, as noted, the unit 22 also performs some peripheral functions. The receiver 42 normally is required to receive pulses transmitted by other aircraft in the formation, and referring to FIG. 6, these pulses are directed to the synchronizer unit 21 where ranging and azimuth information is derived from the received pulses. The synchronizer 21 normally supplies to the instruction word decoder 43 an instruction word which provides control functions to the modulator 44, the automatic gain control sensitivity-time (STC) control 45, and the antenna sequencer 46.

The antenna sequencer 46 has a function of selecting the correct antenna at the proper time from which desired information is received. This is accomplished by commands from the instruction word decoder 43, the receiver 42, and the interfacing multi-mode radar 32. The instruction word decoder sends a command signal to the antenna sequencer which specifies either the omni-antenna or the directional antenna, both of which are housed within the antenna unit 23. The omni-antenna will be used when the directional antenna is directed inboard for 180° of rotation. At all times, azimuth information is provided by one or the other of the directional antennas.

The modulator 44 acts to modulate the transmitter oscillator within the transmitter 41 and to drive the pump oscillator 47. The pump oscillator provides RF energy to the transmitter prior to and immediately after the modulation pump pulse is applied in order to speed up the turn-on time of the transmitter and eliminate pulse jitter.

The circulator 48 normally fed by both the pump oscillator 47 and transmitter 41 has a multi-purpose function of presenting the relatively low forward insertion loss to the transmitted energy and serves as an isolator between the antenna 23 and the transmitter 41 for energy reflected at the antenna. RF energy injected into the circulation from the pump oscillator encounters low insertion loss to the transmitter. The diode limiter 49 within the receiving loop of the transmitter receiver unit between the diode switches and the receiver is provided to limit the RF energy entering the receiver to a safe level.

The output of the receiver 42 is fed to the AGC module 45 and to the antenna sequencer 46. The receiver gain is set to an appropriate level as a function of the input information to the AGC module by means of a voltage output which is generated within the AGC module.

Figure 7:
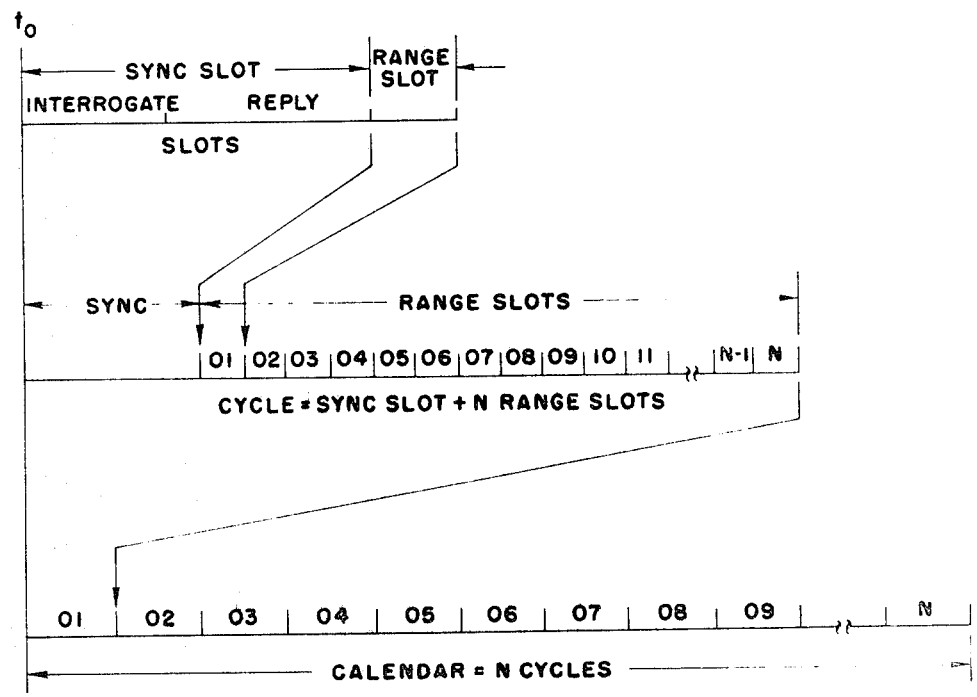
FIGS. 7 and 8 are graphical representations of timing scales showing the interrelation of the various synchronizing means of the present invention.

As has been noted, time synchronization of the members of the formation is accomplished by means of three related cyclic counters. These counters are the "slot counter," "the cycle counter," and the "calendar counter." Broadly stated and referring to FIG. 7, pulses from the clock drive the slot counter, which in turn establishes the primary time division, and further the output from the slot counter drives the cycle counter. If the system is to be used for N vehicles, this cycle will then be divided into (N+ sync time) slot divisions. The N slots are used for ranging purposes. A vehicle assigned to one of the N slots transmits a ranging pulse at the beginning of that slot, while all other vehicles remain silent and receive the transmission later during the slot so that the actual time of receipt at the other vehicles is equal to the propagation time and, therefore, proportional to the distance separating the receiving member and the sending member.

Figure 8:
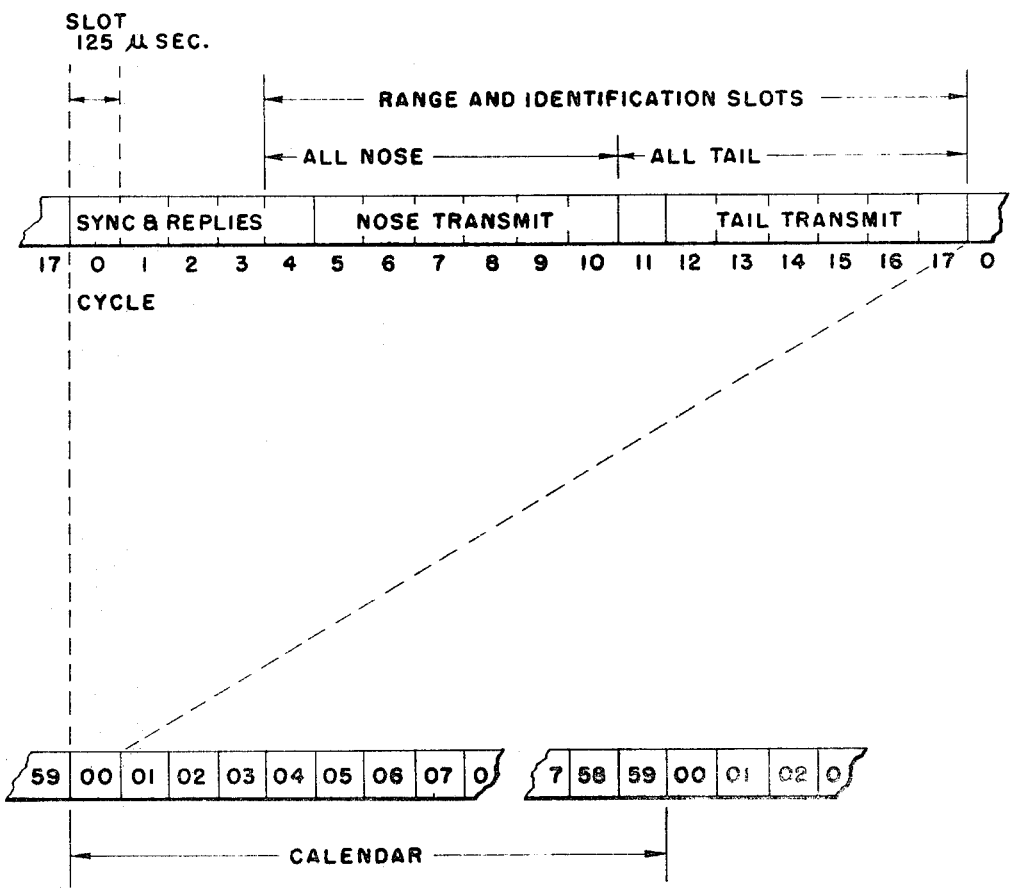

At the end of each cycle count, the output pulse advances the calendar cycle counter. In this way the calendar cycle counter performs as a higher level of control for synchronizing and is the primary feature that permits the all master system to function. The calendar has a count of N periods, which are assigned to control vehicle synchronization. The control order, therefore, is a calendar count of cycle counts of slot counts. By way of explanation by a particular example which is not necessarily all inclusive, the present invention might well be operated by pulses from an accurate 20 mHz. clock which drives the slot counter, which establishes a primary time division of approximately 125 microseconds. Referring now to FIG. 8, the output from the slot counter is counted by the cycle counter. The cycle is divided into 18 slot time periods numbered 0 through 17, the first four of which are used for synchronizing purposes. The remaining slots numbered 4 through 17 are divided into two groups of seven, the first group assigned to the forward transmitter and the last group assigned to the aft or tail transmitter. This arrangement is necessary to obtain 360° required azimuth coverage. The two groups of seven slots are identical, with the last six slots in each group assigned for transmission of ranging pulses from individual aircraft. The first slot in each group, which in this case would be slot 4 and slot 11, is used by all aircraft not transmitting in one of the six slots of that particular calendar cycle count to transmit range and azimuth data for the PPI display.

The six individual aircraft time slots are identified by the present calendar and the present slot number in the following arrangement. The numbers 0 through 5, which correspond to the tens digit in aircraft numbers 00 to 59, are assigned to the six individual aricraft time slots in both the forward and aft transmitter slot groups. The units digit of each aircraft number from 00 to 59 is assigned by the units digit of the present aircraft calendar count. The present calendar number also indicates the number of the aircraft which transmits a synchronization word during the synchronization time period. Therefore, if the present calendar number is 47, for example, the slots are assigned by having the synchronizing time period assigned to aircraft 47 and slots 0 through 5 assigned to 07, 17, 27, 37, 47, and 57, respectively.

The output of the cycle counter advances the calendar one count. The calendar performs as the highest level of control for assigning the synchronizing time period and its primary feature is that of permitting the all master system to function by allowing each aircraft in turn to transmit the synchronization word. The calendar has a total count of sixty cycle periods, as indicated by FIG. 8, which are numbered 00 through 59 which are assigned to control aircraft synchronization. The 00 cycle period has been provided for special purpose use as may be desired. For instance, the 00 cycle period might be used for equipment testing.

In order to have correct time synchronization, all data transmission for identification and ranging is controlled by a stable crystal oscillator clock in each aircraft. Binary counters provide the basic clock frequency of 20 mHz. into major, intermediate and minor time intervals. Therefore, the total control for the present invention, as contemplated by the example of FIG. 8, is a "calendar" of sixty, numbered cycles, a cycle of 18 slots, and a slot of 125 microseconds.

Figure 9:
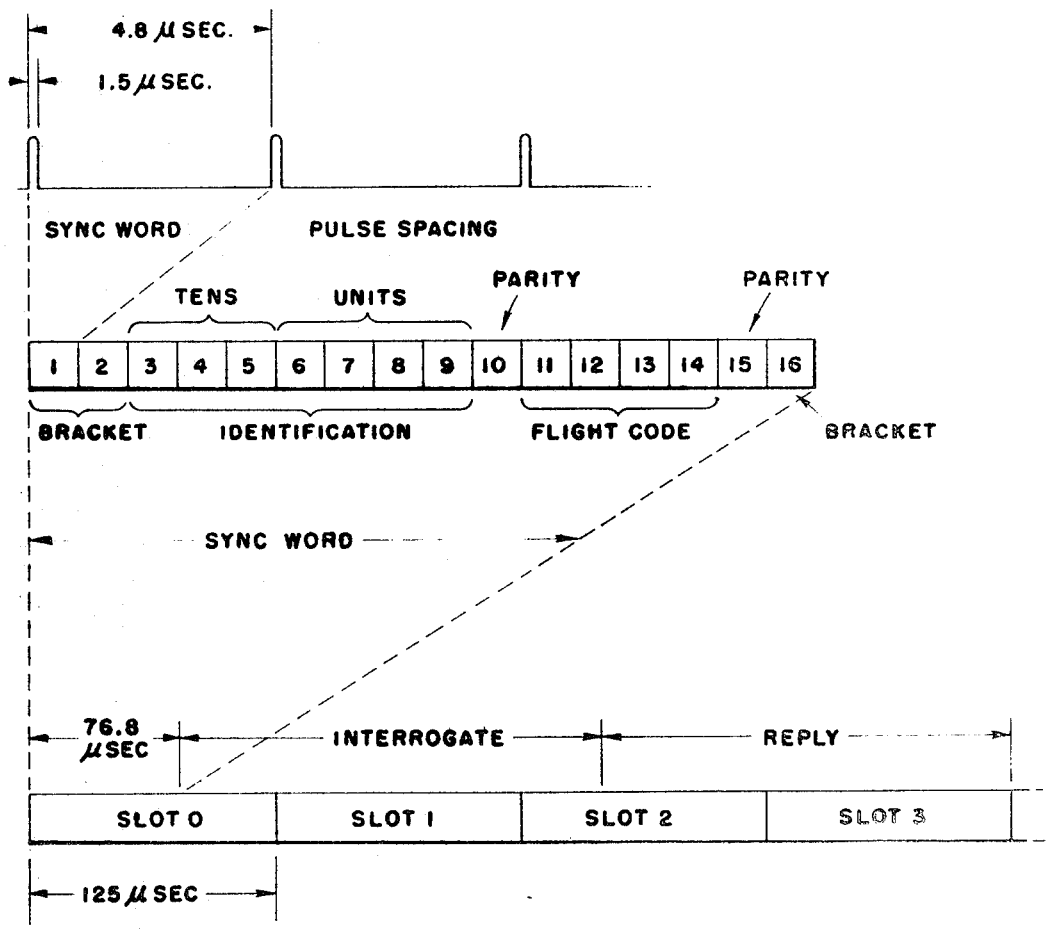
FIG. 9 is representative of the process of a coarse synchronization of the calendar in each vehicle.

Synchronization as envisioned in the present invention occurs in two basic divisions, one being coarse synchronization and the other being fine synchronization. Obviously, proper operation of the present system depends on synchronization of all calendars in a flight formation and synchronization may begin with any aircraft. All aircraft contain identical components for station keeping purposes and for this reason there is no master aircraft, but each aircraft has a calendar cycle number normally assigned to it to accomplish the synchronizing process. The calendar assigns the synchronizing time period in every cycle for the exclusive use of a designated aircraft in that each aircraft is normally assigned an identification number corresponding to one of the cycle counts 0 through 60 of the calendar. During the synchronizing time period the aircraft whose assigned aircraft number is equal to the present calendar cycle number will transmit an interrogation or synchronization word containing 16 bits. As shown in FIG. 9, the first two bits are bracket bits, the third through the ninth bits shows the aircraft identification number which will be equal to the present calendar cycle number, the tenth bit is parity, the eleventh through fourteenth bits contain a flight code as may be required, the fifteenth is flight code parity, and the sixteenth bit is the end bracket.

All aircraft receiving the transmitted synchronization word will check for flight code and parity validity. Upon determining that the received synchronization word is valid, coarse synchronization is accomplished by setting the receiving aircraft's calendar number equal to the received identification number. Thus, coarse synchronization will spread through the formation until all calendars are synchronized. The cycle is reset to the synchronization time period and the slot counter is reset to a reference zero. The remaining synchronization error consists of propagation time between the transmitting and receiving aircraft. If the receiving aircraft's calendar and cycle count already agree with the received synchronization word, coarse synchronization has occurred previously and fine synchronization will then be accomplished. Any aircraft not receiving a synchronization word on its forward antenna within three antenna rotations will automatically switch to allow synchronization from the rear. However, such an aircraft will only transmit its own synchronization word every other time the cycle number coincides with its identification number.

After coarse synchronization has been achieved, the system then proceeds automatically with fine synchronization. Fine synchronization eliminates the propagation time error by resetting the clock of the aircraft which transmits the synchronization word to coincide with the clock of the aircraft making the first reply to the synchronization word transmission. Since, for practical purposes, propagation time is identical both ways, any difference between the two aircraft clocks is equal to the synchronization error. Because of the small relative velocities between aircraft in formation and the speed of the transmitted signals between the aircraft, it can be assumed that for practical purposes the propagation time is identical since the error that would be introduced would be minute.

The synchronization error is always one-half the difference between the received apparent range transit time of the synchronization word as measured at the aircraft receiving the synchronization word and the timed response of the replying aircraft as measured at the initially transmitting aircraft. If this computed error is positive, it is added to the clock of the aircraft which transmitted the synchronization word and receives the reply. If this error is negative, no action will be taken because the system is only allowed to move synchronization in the direction of the earliest clocks. This allows a single synchronization operation in each aircraft because slow clocks will add time to reach the time of the earliest clock in the formation. The synchronization will propagate in all directions from the system with the earliest clock and continue through the formation until all aircraft have been synchronized with the earliest clock. Each aircraft in the formation receives synchronizing timing from the time scales approximately every 0.135 second and coarse synchronization is available each time any aircraft transmits the synchronizing word within radio frequency range.

Figure 10:
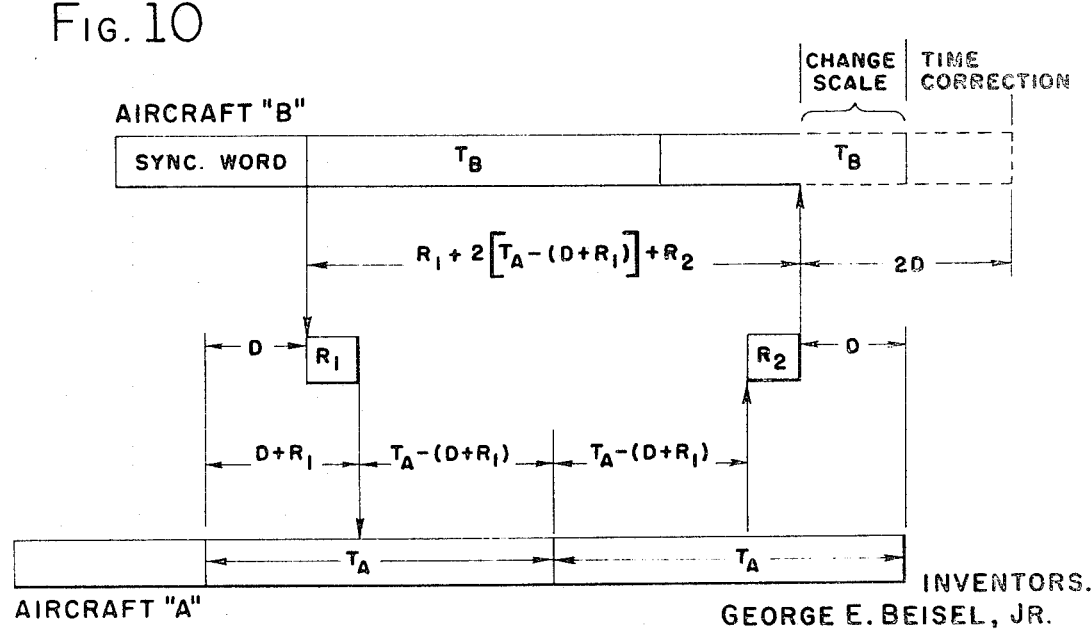
FIG. 10 is a graphic representation of the time synchronization necessary for each calendar in each vehicle in the formation.

The first four slots in each cycle make up the synchronization interval of 500 microseconds, which is further divided into an interrogate and a reply period as illustrated in FIG. 9. As noted above, among aircraft that are in coarse synchronization, only one will transmit a synchronization word during the first synchronization slot in each cycle; however, all aircraft start an auxiliary counter at the end of the time interval allotted for transmission of the synchronization word. This counter has a maximum count equal to time T. Referring now to FIG. 10 for a graphical mathematical representation of synchronization and assuming two aircraft indicated by "A" and "B," when aircraft A receives a synchronization word from aircraft B, the auxiliary counter in A is stopped. The count at that time equals:

$$\text{COUNTER STOP} = D + R_1 \quad (1)$$

where $R_1$ equals the transmission time relay from B to A, and
where the difference between the main counters at A and B equals:

$$D = A - B \quad (2)$$

The time remaining in the auxiliary counter at A, when the synchronization word arrives, is therefore:

$$\text{TIME LEFT} = T_A - (D + R_1) \quad (3)$$

When the main counter in A reaches a count of $T_A$, the auxiliary counter is restarted and allowed to time out, which triggers a synchronization reply. Thus, the time elapsed between arrival of the synchronization word and transmission of the reply is equal to:

$$\text{REPLY DELAY} = 2[T_A - (D + R_1)] \quad (4)$$

Since synchronization word transmission from B occurred at $T_B = 0$, total elapsed time at B when the reply from A is received is equal to:

$$\text{B ELAPSED TIME} = R_1 + 2[T_A - (D + R_1)] + R_2 \quad (5)$$

where $R_2$ equals the transmission time delay from A to B. No significant errors result from the assumptions:

$$R_1 = R_2 \text{ AND } T_A = T_B = T \quad (6)(7)$$

Which allows the simplification:

$$\text{B ELAPSED TIME} = 2T - 2D \quad (8)$$

At the same instance the count at A will be equal to:

$$\text{A ELAPSED TIME} = D + (2T - 2D) = 2T - D \quad (9)$$

Hence, by changing the counting scale by a factor of 2 at B, until the count equals 2T, the difference between the two counters at A and B is eliminated at 2T, and the two aircraft are in fine synchronization. Although many replies may have been triggered by the synchronization word transmission from B, only the first one received is used. In the case where Equation 2 takes a negative value, indicating that the counter at B is ahead of the counter at A, synchronization is not allowed until A transmits the synchronization word and B replies. Hence synchronization is always paced by the fastest clock in the formation.

When time synchronization has been established in a formation, all aircraft will transmit ranging pulses on a precise schedule. Therefore, the ranging pulses may also be used as a means of identification. Relative position and identity of all aircraft within range is established by synchronization range pulse transmission, identification by transmission time slot, determination of range by propagation time, determination of azimuth by antenna position, and resolution of ambiguities by receiver control.

Each calendar cycle of 18 slots, referring to FIG. 8, is divided into a time synchronization interval of 4 slots, and two ranging periods of 7 slots each. In any given cycle numbered MN (with M indicating tens and N indicating units) the synchronization word is transmitted by aircraft number MN, and replies are made by all aircraft within range. During slot number four, all aircraft with identification numbers not ending in N will transmit ranging pulses from the forward antenna. Since all aircraft are time synchronized, transmissions occur simultaneously and the arrival of pulses at any aircraft provides range information suitable for PPI display. During slots 5 through 10, individual aircraft transmit identification pulses as described in the next paragraph. The same aircraft that transmit simultaneously from the forward antenna during slot 4, transmit from the aft antenna during slot 11; and the same aircraft that transmit individually during slots 5 through 10 from the forward antenna, transmit from the aft antenna during slots 12 through 17.

A unique time slot is assigned for each aircraft to transmit an identification pulse. All aircraft that receive such a pulse determine its origin by the current slot and cycle number. As shown in FIG. 8, time slots 5 through 10, and 12 through 17 during each cycle are allotted to identification. In a given cycle numbered MN the six aircraft whose identification numbers end in N each transmit one identification pulse from the forward antenna in the following sequence:

(1) Slot 5, Aircraft 0N
(2) Slot 6, Aircraft 1N
(3) Slot 7, Aircraft 2N
(4) Slot 8, Aircraft 3N
(5) Slot 9, Aircraft 4N
(6) Slot 10, Aircraft 5N The same sequence is repeated during slots 12 through 17, with each aircraft transmitting from the aft antenna. Hence, each aircraft in a formation transmits two identification pulses—one forward and one aft—every ten cycles.

As a representative example taken at random, during cycle number 43, the following complete transmission sequence would apply:

(1) Aircraft No. 43 transmits synchronization word.
(2) All aircraft within range transmit synchronization reply.
(3) Aircraft with identification numbers not ending in 3 transmit range pulses simultaneously from the forward antenna.
(4) Aircraft No. 03 transmits identification pulse from forward antenna.
(5) Aircraft No. 13 transmits identification pulse from forward antenna.
(6) Aircraft No. 23 transmits identification pulse from forward antenna.
(7) Aircraft No. 33 transmits identification pulse from forward antenna.
(8) Aircraft No. 43 transmits identification pulse from forward antenna.
(9) Aircraft No. 53 transmits identification pulse from forward antenna.
(10) Aircraft with identification numbers not ending in 3 transmit range pulses simultaneously from the aft antenna.
(11) Aircraft No. 03 transmits identification pulse from aft antenna.
(12) Aircraft No. 13 transmits identification pulse from aft antenna.
(13) Aircraft No. 23 transmits identification pulse from aft antenna.
(14) Aircraft No. 33 transmits identification pulse from aft antenna.
(15) Aircraft No. 43 transmits identification pulse from aft antenna.
(16) Aircraft No. 53 transmits identification pulse from aft antenna.

Since all transmissions in the synchronized formation are precisely scheduled, the range to any transmitting aircraft is readily determined by measuring the time elapsed from the scheduled transmission point to receipt of a verified range pulse. This measurement is performed by counting the clock cycles. The clock rate in this particular instance has been chosen to equal approximately 50 feet of range per cycle, although it is obvious that other rates could have been chosen.

According to the foregoing, there has been disclosed a station keeping, collision avoidance and position fixing system which primarily allows close and safe operation of vehicles in formation wherein the vehicles are not dependent upon an assigned master station nor are the vehicles dependent upon a fixed ground station for proper synchronization of the various timing means. The present invention overcomes the many inherent difficulties presented by the prior art systems, such difficulties being noted earlier herein, and the present system achieves these improvements by methods not heretofore known.

What is claimed is:

1. A system for enabling vehicular navigation and collision avoidance without prior designation of master control comprising a plurality of cooperating vehicles each having precision synchronizing means, the synchronizing means including a clock means, a transmitter and receiver in each vehicle, means for establishing constant length repetitive time periods in the synchronizing means to effect synchronization between cooperating vehicles, the repetitive time period containing an order of control comprising a calendar of a finite number of cycles each of which has a finite number of slots, wherein during synchronization the cooperating vehicles synchronize arbitrarily to the vehicle having the clock means which indicates the earliest real time.

2. A system for enabling vehicular navigation and collision avoidance without prior designation of master control comprising a plurality of cooperating vehicles each having precision synchronizing means to effect synchronization between each vehicle having said synchronizing means wherein each vehicle is randomly assigned a unique identification number, the synchronizing means including a clock means, a transmitter and receiver in each vehicle, means for establishing repetitive time periods in the synchronizing means, the transmitter adapted to be triggered by the clock means to transmit a synchronizing signal to the receiver in the other cooperating vehicles during an initially random time portion of the repetitive time period, means in each cooperating vehicle to receive the synchronizing signals from each of the vehicles and assign the synchronizing signal of each cooperating vehicle a separate finite time portion of the receptive time period in order to relative times received and thereby effect synchronization between the cooperating vehicles.

3. The system of claim 2 in which the repetitive time period contains an order of control comprising a calendar of a finite number of cycles each of which have a finite number of slots, each vehicle when synchronized is assigned a particular calendar number and transmits only during said calendar number time period.

4. The system of claim 3 wherein the synchronizing signal sent by the vehicle whose clock means has the earliest relative time arbitrarily becomes the station to which the other clok means of each of the cooperating vehicles synchronize.

5. The system of claim 4 wherein each cooperating vehicle transmits a ranging pulse after synchronization within its cycle number transmission time period while all other cooperating vehicles remain silent and receive the transmission within the transmitting vehicle's calendar number time period so that the time from transmission until reception is substantially equal to the propagation time and proportional to the distance separating the transmitting and receiving vehicles.

6. The system of claim 5 including means on each cooperating receiving vehicle for determining the relative spatial relationship of the transmitted ranging pulse thereby indicating relative positions of the transmitting and receiving vehicles.

7. A method of enabling vehicular navigation between a plurality of cooperating vehicles each having means for transmitting and receiving signals from one another and having precision synchronizing means including clock means to synchronize said signals, the method comprising; establishing constant length repetitive time periods, providing several discrete time zones within the time periods wherein each cooperating vehicle is assigned one zone, causing a random first vehicle having the clock means with the earliest real time to transmit an identification signal containing identities arranged in predetermined order during its time zone, receiving the signal by a second additional cooperating vehicle and comparing the predetermined order of identities in the received signal against the identity of the time zone indicated at the second vehicle when the signal was received, causing the time zones at the second vehicle to be re-identified to correspond to the order of identities of the time zones transmitted by the first vehicle.

8. The method of enabling vehicular navigation as set forth in claim 7 further comprising; determining at the second vehicle the correct time zone for said vehicle, causing the second vehicle to transmit its identity signal within the re-identified correct time zone, receiving at the first vehicle the identity signal of the second vehicle and thereafter during the correct time zone transmitting from the first vehicle its identity signal, receiving the last said identity signal at the second vehicle, comparing the propagation times of signals between the first and second vehicles and correcting the precision synchronizing means at the second vehicle by resetting said synchronizing means to be in precise synchronization with the synchronizing means of the first vehicle.

9. The method of enabling vehicular navigation as set forth in claim 8 further comprising; synchronizing the precision synchronizing means of subsequent vehicles by comparing the order of relative times the identification signal of each vehicle is received by each other vehicle, determining the vehicle whose identification signal is received by all cooperating vehicles at the earliest relative time, synchronizing all precision synchronizing means to the vehicle transmitting the signal having the earliest relative time.

10. The method of enabling vehicular navigation as set forth in claim 9 further comprising; determining at the receiving vehicle by the receiving means the relative spatial relationship of all received identification signals from the cooperating vehicles.

11. A system for synchronizing communication systems employing real time synchronization without prior designation of master control comprising a plurality of cooperating stations each having precision synchronizing means, the synchronizing means including a clock means and a transmitter and a receiver in each station, means for establishing constant length repetitive time periods in the synchronizing means to effect synchronization between cooperating stations, the repetitive time period containing an implanted order of synchronizing control having an order sequence of a finite number of cycles each of which has a finite number of slots, each station having an assigned cycle number, means to effect synchronization of the stations by firstly coarse synchronization and secondly fine synchronization, said last means causing cooperating stations to coarse synchronize arbitrarily to the first station whose assigned cycle number is received and verified and to fine synchronize arbitrarily to the station having clock means indicating the earliest real time.

12. A system for synchronizing communication systems employing real time synchronization without prior designation of master control comprising a plurality of cooperating stations, each station having precision synchronizing means to effect synchronization of all stations having said synchronizing means wherein each station is assigned a unique identification number, the synchronizing means including a clock means and a transmitter means and a receiver means in each station, means for establishing a repetitive time period in the synchronizing means, the transmitter means adapted to be triggered by the clock means to transmit a synchronizing signal to the receiver means in the other cooperating stations during an assigned initially random occurring part of the repetitive time period, means at each cooperating station to receive the synchronizing signals from each of the stations to determine the assigned part of the repetitive time period of the first station synchronizing signal to be received and verified thus determining large synchronization errors, means to reset the repetitive time sequence locally to agree with the synchronizing signal received, means in each receiving station to trigger its transmitting means to reply to the synchronizing signal, the receiver means within the station transmitting the synchronizing signal further having means to determine small synchronization errors based upon the time of arrival of the first reply and thereby to correct the local clock to agree with the clock of the transmitting station to thereby effect synchronization between the cooperating stations.

References Cited

UNITED STATES PATENTS

| | | | |
|---|---|---|---|
| 3,369,239 | 2/1968 | Perkinson et al. | 343—7.5 |
| 3,388,393 | 6/1968 | Graham et al. | 343—7.5 |
| 3,440,652 | 4/1969 | Bates et al. | 343—7.5 |
| 3,262,111 | 7/1966 | Graham | 343—7.5 |
| 3,409,889 | 11/1968 | Graham | 343—7.5 |

RICHARD A. FARLEY, Primary Examiner

T. H. TUBBESING, Assistant Examiner

PO-1050
(5/69)

UNITED STATES PATENT OFFICE
CERTIFICATE OF CORRECTION

Patent No. 3,560,991            Dated February 2, 1971

Inventor(s) GEORGE E. BEISEL, JR. and EDGAR C. MILLS, JR.

It is certified that error appears in the above-identified patent and that said Letters Patent are hereby corrected as shown below:

Column 11, line 36, "receptitive" should read -- repetitive -- line 37, "to" should read -- of -- line 49, "clok" should read -- clock --.

Column 12, line 48, "order" should read -- ordered --.

Signed and sealed this 13th day of July 1971.

(SEAL)
Attest:

EDWARD M. FLETCHER, JR.           WILLIAM E. SCHUYLER, JR.
Attesting Officer                  Commissioner of Patents